Patented Apr. 19, 1932

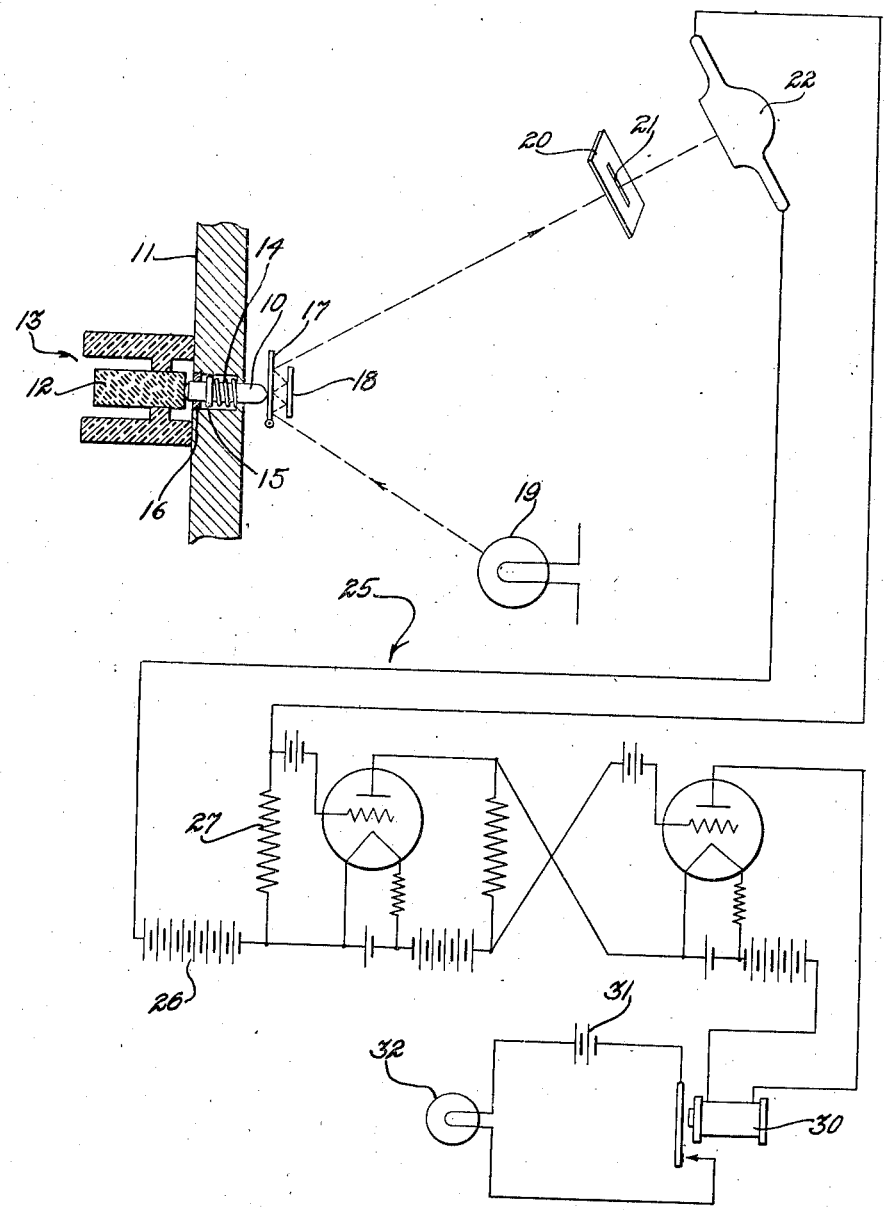

1,854,838

UNITED STATES PATENT OFFICE

RALPH CLAYTON HARTSOUGH, OF BERWYN, ILLINOIS, ASSIGNOR TO WESTERN ELECTRIC COMPANY, INCORPORATED, OF NEW YORK, N. Y., A CORPORATION OF NEW YORK

APPARATUS FOR INSPECTING MATERIAL

Application filed October 29, 1927. Serial No. 229,625.

This invention relates to an apparatus for inspecting material, and more particularly to apparatus for gauging surface configurations.

The primary object of this invention is to provide a measuring apparatus employing reflected light rays whose distance of reflection is minimized.

One embodiment of the invention consists in a master reference surface having a spring pressed member adapted to engage the surface of the material under test and to move a hinged mirror in accordance with variations in the surface to deflect a beam of light reflected a plurality of times between the hinged mirror and a fixed mirror and thence to a light sensitive cell where the result is indicated by the actuation of a signal.

For a better understanding of this invention reference is made to the following description taken in connection with the accompanying drawing, in which The figure is a fragmentary cross-sectional view of a measuring device shown in association with a diagrammatic view of an indicating mechanism.

Referring now to the drawing in which the same reference characters indicate similar parts throughout the disclosure, a spring pressed pin 10 slidable in and protruding from both sides of a member having a master reference surface 11 engages and follows variations in the surface of a carbon insert 12 in a telephone protector block 13, the air gap of which is being measured. A coil spring 14 around the pin 10 presses against a shoulder 15 of the pin and maintains an end of the pin in positive engagement with the surface of the carbon insert 12. An externally threaded circular part 16 flush with the master surface 11 retains the pin 10 in association with the member having the master surface. The other end of the spring pressed pin 10 is kept in engagement with a hinged mirror 17 by means of a spring (not shown) or any suitable means, such that if the pin is moved a corresponding movement of the mirror will take place, the hinged mirror 17 being secured to the member provided with the reference surface 11 in any suitable manner. Positioned opposite the hinged mirror 17 is a fixed or stationary mirror 18 which may be supported in any suitable manner. An electric lamp 19, which may be connected with any suitable source of power, is placed at a suitable angle to the hinged mirror 17 so that a beam of light will be reflected several times between the two mirrors and reflected to a screen 20 having an aperture 21. The aperture 21 is made of a predetermined size so that when the variations in the surface under test are within a predetermined value the light beam will pass through the aperture and be impressed on a photoelectric cell 22. The photoelectric cell 22 is connected to the input circuit of a two stage vacuum tube amplifier 25 through a battery 26 and a high resistance 27. Connected to the output side of the amplifier 25 is a relay 30 adapted to close a signal circuit having a battery 31 and a lamp 32.

In the operation of the gauging device, a protector 13, the air gap of which is to be determined, is pressed against the master surface 11 so that the face of the carbon block 12 depresses the spring pressed member 10. The force applied by the operator to the protector 13 compresses the spring and the member 10 is forced outwardly moving the hinged mirror 17 to an angle corresponding to the distance between the face of the carbon block 12 and the master reference surface 11 which corresponds with the air gap of the protector. A beam of light from the lamp 19 is reflected a plurality of times between the hinged mirror 17 and the fixed mirror 18. The plurality of reflections between the mirrors increases the angle of reflection 2N times, where N equals the number of times the beam of light is reflected from the movable mirror 17. This arrangement permits of a very compact device as the photoelectric cell 22 can be brought much closer to the mirrors 17 and 18, thus reducing the length of the light beam necessary for small permissible variations in the surface under test.

If the size of the air gap is within a predetermined limit the beam of light passes through the aperture 21 in screen 20 into the photoelectric cell 22. The light beam energizes the cell and causes a current to flow from the battery 26 through the resistance 27 changing the potential of the input circuit. This change causes the amplifier 25 to send forth sufficient current to operate the relay 30 which closes a circuit permitting the battery 31 to light the lamp 32. The illumination of this lamp is a signal to the operator that the part under test is satisfactory.

Although the invention as herein described and illustrated is particularly well adapted to measure air gaps in telephone protector blocks, it should be understood that the novel features are capable of other applications and the invention should be limited only by the scope of the appended claims.

What is claimed is:

1. In an apparatus for gauging material, a plurality of reflecting elements disposed in substantially parallel planes means for casting a beam of light on one of the elements, means for engaging the material for effecting movement of one of said reflecting elements relative to the other in accordance with variations in the material under test for causing a deflection of the reflection of the beam of light between the reflecting elements, and means controlled by the beam of light for indicating a predetermined variation in the position of one of the reflecting elements.

2. In an apparatus for gauging material, a pivoted reflecting element, a fixed reflecting element, means for casting a beam of light on one of said elements, means for varying the position of the pivoted reflecting element in accordance with variations in the material under test, and means for indicating a predetermined variation in the angular position of the pivoted reflecting element.

3. In an apparatus for gauging a material, a master reference surface, a mirror disposed at a predetermined angle to the master reference surface and movable about a fixed point, means for casting a beam of light on said mirror, a fixed mirror opposite the movable mirror to reflect light reflected from the movable mirror back to the movable mirror, means for varying the angle of the movable mirror with reference to the master surface and in response to variations in the material being gauged, and means for indicating a predetermined variation in the angle of the movable mirror.

4. In an apparatus for gauging material, means for producing a beam of light, a pivoted mirror disposed at a predetermined angle for reflecting the beam of light, a fixed mirror adapted to receive the reflected beam of light and reflect it back to the pivoted mirror, means for varying the angle of the pivoted mirror in response to variations in the material being gauged, and light sensitive means responsive to the reflected light for indicating a predetermined variation in the angle of the pivoted mirror.

5. In an apparatus for gauging a material, means for producing a beam of light, a master reference surface, a pivoted reflecting surface positioned to reflect the beam of light, a fixed reflecting surface for causing a plurality of reflections of the light beam between the two reflecting surfaces, means for moving the pivoted reflecting surface in accordance with variations in the material being gauged, and means for indicating a predetermined variation in the position of the pivoted surface with respect to the master surface.

6. In an apparatus for gauging a material, a means for producing a beam of light, a master reference surface, a pivoted mirror for reflecting the beam of light, a fixed mirror opposite the pivoted mirror for reflecting light reflected from the pivoted member back to the pivoted mirror, a spring pressed member associated with the master reference surface adapted to move the pivoted mirror in accordance with variations in the material being gauged, and a light sensitive means for indicating a predetermined variation in the angular position of the pivoted mirror.

7. In an apparatus for gauging material, a master surface having means movable perpendicularly thereof in accordance with the variation from normal of a part under test, a pivotally mounted mirror so located as to be affected by the travel of said movable means, a stationary mirror mounted oppositely of the pivoted mirror and parallel to its normal plane, a source of light and a light sensitive cell mounted remotely of the pivoted mirror, and so positioned with respect of each other that a beam from the source of light is reflected a plurality of times between the two mirrors before reaching the light sensitive cell and means actuated by the light sensitive cell for effecting a signal.

In witness whereof, I hereunto subscribe my name this 20th day of October, A. D. 1927.

RALPH CLAYTON HARTSOUGH.